United States Patent
Doumet

(10) Patent No.: US 6,395,075 B1
(45) Date of Patent: May 28, 2002

(54) METHOD OF PRODUCING A WATER-REPELLENT PRODUCT, AND PRODUCT AND METHOD FOR WATERPROOFING A SURFACE OF A BUILDING MATERIAL

(76) Inventor: Joseph E. Doumet, 1, Rue Jacob, 75006 Paris (FR)

(*) Notice: Subject to any disclaimer, the term of this patent is extended or adjusted under 35 U.S.C. 154(b) by 0 days.

(21) Appl. No.: 09/284,761

(22) PCT Filed: Aug. 6, 1998

(86) PCT No.: PCT/EP98/04914
§ 371 (c)(1), (2), (4) Date: Apr. 4, 2000

(87) PCT Pub. No.: WO99/31028
PCT Pub. Date: Jun. 24, 1999

(30) Foreign Application Priority Data

Dec. 15, 1997 (EP) .............................. 97122083

(51) Int. Cl.$^7$ .............................. C09K 3/18; C09D 1/04; C09D 1/10; C09D 1/12
(52) U.S. Cl. ................. 106/2; 106/14.11; 106/14.44; 106/612; 106/613; 106/634; 106/287.1; 106/286.6
(58) Field of Search .................. 427/376.2, 397.8, 427/352, 353, 419.2, 428, 421, 427, 429; 106/14.11, 14.44, 612, 613, 634, 2, 287.1, 286.6, 286.2

(56) References Cited

U.S. PATENT DOCUMENTS

| 987,597 | A | * | 3/1911 | Patterson | ..................... 106/80 |
| 1,541,606 | A | * | 6/1925 | Wert | ........................... 106/76 |
| 3,047,407 | A | * | 7/1962 | Ehrenburg | ................... 106/12 |
| 4,018,616 | A | * | 4/1977 | Sugahara et al. | ............. 106/74 |
| 4,185,135 | A | * | 1/1980 | Huff | ........................... 428/96 |

FOREIGN PATENT DOCUMENTS

| EP | 237016 | A | * | 9/1987 |
| GB | 927059 | A | * | 5/1963 |

OTHER PUBLICATIONS

Japanese patent abstract of JP 85–059674 by Nisshin Kogyo KK, Jan. 1985.*

* cited by examiner

Primary Examiner—Michael Barr
(74) Attorney, Agent, or Firm—Reising, Ethington, Barnes, Kisselle, Learman & McCulloch, P.C.

(57) ABSTRACT

The invention relates to the production and use of a water-repellent and impregnating product for surfaces of building materials. In order to be able to waterproof and impregnate building material surfaces in a relatively simple, economical and yet very reliable and durable manner, a coating product is proposed which is produced from two aqueous solutions and forms an aqueous solution product which contains silicon, calcium and sodium ions, wherein the capacity for dissolving the calcium oxide is increased by a dissolving agent added to the water and the finished product, after application and drying on the building material surface, forms a glass-like surface film.

4 Claims, No Drawings

METHOD OF PRODUCING A WATER-REPELLENT PRODUCT, AND PRODUCT AND METHOD FOR WATERPROOFING A SURFACE OF A BUILDING MATERIAL

The invention relates to a method of producing a waterproofing product, to such product, and to a method for impregnation of a surface of solid building materials against liquids as well as against chemical and biological corrosion.

BACKGROUND OF THE INVENTION

There are on the market numerous products or agents which are intended for painting or coating of surfaces of solid building materials, such as walls, ceilings and/or floors of parts of buildings, water tanks, swimming pools or the like, in order to waterproof these surfaces and/or to impregnate them against chemical and biological corrosion. These known products generally are rubber-based or plastic-based products (synthetic resin or epoxy resin) or special paints. However, the known products available on the market have shown themselves to be frequently inadequate in their effect and in their durability, particularly when several requirements are to be met simultaneously, as is the case for example when surfaces are to be protected against liquids (particularly water) and also simultaneously against chemical and/or biological corrosion, such as occurs for example in water reservoirs, swimming pools and the like which are built in the open.

The GB-A-927 059 discloses a waterproof composition containing the following components in percent by weight: Curd Soap 10% to 18%, Water 28% to 40%, Slaked Lime 44% to 50%, and Sodium Silicate 2% to 4%. Such a waterproofing composition can be manufactured in the following way:

shredding or flaking Curd Soap and stirring it into a quantity of Water heated in a container;

adding further Water whilst the mixture is still under heat, until the Soap has been completely dissolved;

boiling the dissolved soap and water mixture;

adding slaked lime gradually thereto, slowly mixing the materials, removing them from the heat;

and adding Sodium Silicate.

In this way, a thick paste is formed which can be marketed without further modification. This paste may be—for use—mixed up with water and various dilutions, so that, obviously, this will generally result only in any diluted paste. Such a waterproofing composition may be applied to walls, stone-work or plaster, or may be added to cement, plaster and similar liquid mixture appropriate for rendering walls or the like prior to making up. Where such a composition is for use as a coating material on already prepared walls or other surfaces, the strength is relatively week, whereas, when the composition is added to liquid mixtures for new building purposes, the strength may be much higher (cf. page 1, lines 76 to 78 in this specification).

According to the Abstract of JP-A-60 016 898 (NISSHIN KOGIO KK), Jan. 28, 1985 (DATABASE WPI, Section Ch, Week 8510, Derwent Publications Ltd., London/GB), a composition is prepared of water glass (35–50 wt. %), NaOH or KOH (0.5–3 wt. %) water (10–30 wt. %), cement (10–30 wt. %), Ca oxide (0.5–3 wt. %), Al powder (0.5–5 wt. %), filler (Ca carbonate, Mg carbonate, Mg hydroxide, silica stone powder . . . of 10–30 wt. %) and glycerin (2–6 wt. %). Such a composition is useful for the preparation of foam material for heat-insulating material, filtering material, sound absorber etc. A so-formed waterproof foam body has high strength and high durability at ordinary temperatures. However, such a composition for forming a foam body is not able to produce or propose, respectively, a product to be applied relatively simply and quickly to a surface of a building material which is to be waterproofed or protected in a very economical and durable way, as it is proposed with the teaching of the present application, particularly in order to close pores of surface walls or the like.

The object of the invention, therefore, is to provide a method of producing a waterproofing product, such waterproofing product, and a method of treating surfaces of building materials in such a way that, on the one hand, a treatment product or coating product is made available which is relatively simple and economical to produce as well as having many uses and being reliable and durable in its effect and, on the other hand, such a product can be applied relatively simply and quickly to a surface of a building material which is to be protected.

SUMMARY OF THE INVENTION

A first aspect of the present invention concerns a method of producing or preparing a treatment product or coating product in order to make a surface of corresponding building materials water-repellent or waterproof and thereby to impregnate or protect this surface against liquids as well as against chemical and biological corrosion. According to the invention such a product is generally produced by the following steps:

a) preparing a first aqueous solution (base solution) by dissolving calcium oxide (CaO) in a quantity of water with the aid of a dissolving agent which is admixed with this quantity of water in order to increase the dissolution or the dissolving effect of the calcium oxide in water;

b) preparing a second aqueous solution which contains water and sodium silicate;

c) mixing together the first aqueous solution with the second aqueous solution so that an aqueous solution product (treatment product or coating product) is formed which contains silicon, calcium, and sodium ions and which forms on the corresponding building material surface a film or coating having glassy characteristics.

By means of this method of production according to the invention, a product is made available which is ready for use in the form of an aqueous solution and which can be applied in a manner which is extremely simple to handle and relatively quickly to a building material surface which is to be protected. However, in the dried state the product produces a solid and durable, insoluble surface film due to the double silicate [sodium calcium silicate] which is formed because of the silicon, calcium and sodium ions present in the prepared aqueous solvent product.

THE PREFERRED EMBODIMENTS

In the method of producing the product particular importance is given to the knowledge that calcium oxide dissolves in water only in extremely small quantities. In order to be able to dissolve a sufficient quantity of calcium oxide in the given quantity of water, first of all according to the invention the first aqueous solution (base solution) referred to above under a) is prepared, in which a sufficiently large quantity of calcium oxide can be dissolved in the predetermined quantity of water because this quantity of water has a suitable dissolving agent mixed with it in order thereby to improve or to increase the dissolution of the calcium oxide. In this connection it should be mentioned that only approximately 1 g of calcium oxide can be dissolved in one liter of water; however, by the admixture of the dissolving agent a multiple of this quantity of calcium oxide can be dissolved in the same quantity of water, so that this admixture of the dissolving agent makes it possible to dissolve a correspondingly larger quantity of calcium oxide in the same quantity of water and thereby to control the ratio of calcium oxide and sodium silicate in the prepared aqueous solution product.

Basically any dissolving agent which is suitable for dissolving an increased quantity of calcium oxide in the given quantity of water can be used in the quantity of water of the first aqueous solution-. According to the present invention it is particularly preferred if sugar in the form of saccharose ($C_{12}H_{22}O_{11}$) is dissolved as dissolving agent in the first aqueous solution in order to dissolve an increased quantity of calcium oxide therein. Thus ordinary sugar can be used to a certain extent as a type of catalyst in order markedly to increase the dissolving power of the calcium oxide in water. Thus for example approximately 32 g of calcium oxide can dissolve in a liter of water in which 400 g of sugar/saccharose are dissolved, which means that 100 g of sugar/saccharose contribute to approximately 8 g of calcium oxide being dissolved in a corresponding quantity of water.

In many cases, however, it may also be favourable in the method of production according to the invention to mix glycerine ($CH_2OH-CHOH-CH_2OH$) as dissolving agent into the first aqueous solution in order to increase the dissolution of the calcium oxide therein. With this use of glycerine, however, it should be noted that an increased quantity of calcium oxide can indeed be dissolved in the water, but the capacity for dissolving calcium oxide in the water is less than when saccharose is used. In any case, however, by the admixture of glycerine to the first aqueous solution a quantity of calcium oxide of approximately 3.5% by weight of the glycerine can be dissolved, which can be sufficient for many uses of the finished product.

When the first aqueous solution is being prepared the procedure is advantageously such that first of all a quantity of water is boiled in order to degasify or to demineralise the water. Then the dissolving agent is added to this quantity of water and thereupon the calcium oxide in the form of quicklime or calcium hydrate (in the quantity required in the particular case) is admixed with the water at room temperature and thereby dissolved, so that this first aqueous solution is formed. By this degasification all carbonic acid gas is removed from this water, since otherwise carbonic acid gas would precipitate calcium oxide as calcium carbonate ($CaCO_3$). Only afterwards is the dissolving agent (saccharose or glycerine) added to the quantity of water (dissolved or mixed). Although this addition of the dissolving agent can take place into warm water, it is preferable for the water first of all to be cooled to room temperature (approximately 20 to 25° C.) after the degasification and only thereafter for the dissolving agent to be added. The coordinated quantity of calcium oxide, likewise at room or ambient temperature, is then admixed with the water so that it can be dissolved therein.

For the production according to the invention of the treatment product or coating product, calcium oxide is advantageously added in the form of quicklime (CaO) in a ratio which depends upon the quantity of dissolving agent used, calcium hydrate ($Ca(OH)_2$) being formed in the first aqueous solution. However, as mentioned above, calcium hydrate ($Ca(OH)_2$) can be directly added instead of quicklime.

According to the invention it is also advantageous that calcium oxide and sodium silicate are added to (dissolved in) the first and second aqueous solutions in such quantities or proportions that the finished aqueous solution product, that is to say the treatment product or coating product, contains a ratio of calcium to sodium, i.e. Ca: $Na_2$ of approximately 0.1 to 1.0 by weight. The flexibility or the strength of the dried and hardened finished product film on the building material surface to be protected can be controlled in the desired manner by means of this ratio of Ca: $Na_2$. In fact, the greater the ratio of Ca: $Na_2$ is, the harder and less flexible the dried product film on the coated surface becomes; however, if this ratio in the finished product is too low, then the latter becomes more easily soluble in water, whilst too high a proportion of calcium (Ca) gives the finished product film a tendency to fracture or bursting.

Amongst the various possible types of sodium silicate used here, in the tests on which the invention is based sodium metasilicate pentahydrate ($Na_2*SiO_3*5H_2O$), which in the dissolved state can be used in the second aqueous solution, has proved very favourable. However, other formulas of sodium silicate may be used, as they are soluble in water.

The present invention is—according to a second aspect—also directed to a product or agent for water-repellent/waterproof treatment and for impregnation of a surface of building materials against liquids (particularly water and the like) as well as against chemical and biological corrosion. According to the invention this product is distinguished by an aqueous solution product which contains silicon, calcium, and sodium ions, wherein calcium oxide is dissolved in water, a dissolving agent having been added to the water, and wherein this aqueous solution product, after it has been applied to the surface of the building material and dried there, forms a glassy surface film. This product is preferably one which has been produced according to the method described above. This aqueous solution product therefore advantageously contains calcium and sodium in a ratio, by weight, of Ca: $Na_2$ of approximately 0.1 to 1.0.

This aqueous solution product therefore advantageously contains calcium and sodium in a weight ratio of Ca: $Na_2$ of approximately 0.1 to 1.0.

Even when the dissolving agent used in the finished product (for increased dissolution of a sufficient quantity of calcium oxide in the water) may be of various types, particularly preferred is sugar in the form of saccharose, which is previously dissolved in a first aqueous solution as dissolving agent for dissolving the calcium oxide. Sugar or saccharose is capable of dissolving a particularly large quantity of calcium oxide in the water, as has already been explained above. Glycerine, which in many cases can likewise be admixed as dissolving agent with the initial quantity of water or a first aqueous solution has by comparison a somewhat reduced capacity for dissolving calcium oxide in water.

It should also be mentioned at this point that other suitable dissolving agents are also conceivable for increased dissolution of the calcium oxide in the water, even if they do not generally achieve the particularly favourable and high dissolving effect of sugar or saccharose. Phenol, an organic chemical product, may be mentioned for example as another conceivable dissolving agent to be used instead of the organic dissolving agent saccharose.

If sugar or saccharose is used as dissolving agent in the aqueous solution product according to the invention, then the finished product thus produced contains the following components in % by weight:

52.5 to 56% water ($H_2O$)

24 to 33% saccharose ($C_{12}H_{22}O_{11}$)

1.9 to 2.7% calcium oxide (CaO)

8.6 to 21.3% sodium metasilicate pentahydrate ($Na_2*SiO_3*5H_2O$)

If, by contrast, glycerine is used as dissolving agent in the aqueous solution product, then this product contains the following components in % by weight:

55.6 to 68% water ($H_2O$)

31 to 36.6% glycerine ($C_2OH$—CHOH—$CH_2OH$)

1.1 to 1.31% calcium oxide (CaO)

4.3 to 12.3% sodium metasilicate pentahydrate ($Na_2*SiO_3* 5H_2O$).

Some examples of different compositions in the product according to the invention are set out below, on the one hand in the case where sugar/saccharose is used as dissolving agent and on the other hand in the case where glycerine is used as dissolving agent, and moreover these examples of compositions differ in the different ratios of Ca: $Na_2$ in the particular compositions.

EXAMPLE 1

With a ratio Ca: $Na_2$ of 0.3, individual components being listed in % by weight:

| | |
|---|---|
| 52.5% | water ($H_2O$) |
| 24.27% | saccharose ($C_{12}H_{22}O_{11}$) |
| 1.93% | calcium oxide (CaO) |
| 21.3% | sodium metasilicate pentahydrate ($Na_2 * SiO_3 * 5H_2O$) |
| 100% | |

EXAMPLE 2

Use of saccharose as dissolving agent, with a ratio Ca: $Na_2$ of 0.5:

| | |
|---|---|
| 54.12% | water ($H_2O$) |
| 28.55% | saccharose ($C_{12}H_{22}O_{11}$) |
| 2.28% | calcium oxide (CaO) |
| 15.04% | sodium metasilicate pentahydrate ($Na_2 * SiO_3 * 5H_2O$) |
| 100% | |

EXAMPLE 3

Use of saccharose as dissolving agent, with a ratio Ca: $Na_2$ of 1:

| | |
|---|---|
| 55.78% | water ($H_2O$) |
| 32.92% | saccharose ($C_{12}H_{22}O_{11}$) |
| 2.63% | calcium oxide (CaO) |
| 8.67% | sodium metasilicate pentahydrate ($Na_2 * SiO_3 * 5H_2O$) |
| 100% | |

EXAMPLE 4

Use of glycerine as dissolving agent, with a ratio Ca $Na_2$ of 0.3:

| | |
|---|---|
| 55.63% | water ($H_2O$) |
| 31.0% | glycerine ($CH_2CH$—CHOH—$CH_2OH$) |
| 1.11% | calcium oxide (CaO) |
| 12.26% | sodium metasilicate pentahydrate ($Na_2 * SiO_3 * 5H_2O$) |
| 100% | |

EXAMPLE 5

Use of glycerine as dissolving agent, with a ratio Ca: $Na_2$ of 0.5:

| | |
|---|---|
| 56.8% | water (H2O), |
| 33.94% | glycerine ($CH_2OH$—CHOH—$CH_2OH$), |
| 1.22% | calcium oxide (CaO), |
| 8.04% | sodium metasilicate pentahydrate ($Na_2SiO_35H_2O$) |
| 100% | |

EXAMPLE 6

Use of glycerine as dissolving agent, with a ratio Ca: $Na_2$ of 1:

| | |
|---|---|
| 57.83% | water (H2O), |
| 36.53% | glycerine ($CH_2OH$—CHOH—$CH_2OH$), |
| 1.31% | calcium oxide (CaO), |
| 4.33% | sodium metasilicate pentahydrate ($Na_2SiO_35H_2O$) |
| 100% | |

Generally, all these compositions forming the aqueous solution product can be diluted by water if needed or helpful for use.

According to a third aspect the present invention also relates to a method of waterproofing and impregnating a building material surface in order to protect this against liquids, particularly water and the like, as well as against chemical and biological corrosion, by the application of a coating product in its liquid or paintable state onto the surface which is to be protected. According to the invention this takes place by the following steps:

a) preparation of a first aqueous solution by dissolving a quantity of calcium oxide in a quantity of degasified (or dimineralised) water with the aid of a dissolving agent which is admixed with this quantity of water in order to increase the dissolution (dissolving capacity) of the calcium oxide;

b) mixing together this first aqueous solution with a second aqueous solution containing sodium silicate in order to form an aqueous solution product (as coating product) which contains silicon, calcium and sodium ions;

c) application of this aqueous solution product onto the surface of the building material on which it dries and hardens to a glassy surface film.

In this case the product produced by the method according to the invention as described can in particular be used as a coating product. The aqueous solution product thus produced can be applied extremely simply and quickly to a building material surface which is to be protected. The product which is applied to this surface and dried and hardened to a glassy surface film constitutes a coating product which has very many uses and acts extremely reliably and durably and which—because of the production described above and the components used therein—can also be produced very simply and economically.

In the practical application of the coating product thus produced it may be advantageous to apply this in several thin layers onto the surface of the building material to be protected in order to waterproof and impregnate this surface. This application can be carried out in particular by rolling (with paint rollers), brushing or spraying. The coats applied to a building material surface can be dried and hardened by the use of warm air and/or by natural evaporation (due to the influence of ambient air). After this drying and hardening parts of the dissolving agent can be crystallised out towards the surface. These parts of the dissolving agent which are precipitated in the surface film can be washed off in a simple manner, for example with the aid of water, but optionally also these parts which are precipitated can simply be washed off naturally by the rain. By the way, the precipitation of saccharose will be in the form of a crystallisation.

This method according to the invention can be used in particular for waterproofing and impregnation of porous surfaces on so lid building material, particularly concrete, concrete-like or cement-like materials, stone materials, wood and the like.

Finally, a practical embodiment will be explained.

In the tests on which the invention is based the walls of an old swimming pool for example were waterproofed and impregnated with the coating product produced according to the invention for instance using the method of treatment described above.

In this old swimming pool the inner faces consisted of a mosaic of ceramic parts in small pieces, between which there were cement joints. Moss had grown increasingly on the inner faces or surfaces of these swimming pool walls, apart from the fact that the inner faces had in part become permeable to water.

First of all it was attempted on the one hand to waterproof the cleaned inner faces (wall surfaces) and on the other hand to impregnate them in particular against the growth of moss using a large number of various products available on the market (which had a rubber or synthetic resin base or were special paints). None of these known products could permanently eliminate the said growth of moss and at the same time create sufficient impermeability to water. The use of some of these known products even led to unwanted colour changes in the mosaic walls of the swimming pool, which brought new problems with it.

The inner faces (surfaces) of these swimming pool walls were thereupon coated by the method according to the invention with the product produced according to the invention. Accordingly the aqueous solution product was applied to the inner faces of the walls and of the base of the swimming pool with the aid of a paint roller in a plurality of thin coats, namely five coats, sufficient time being allowed between applications to facilitate thorough drying out. The complete drying out and hardening of the finished product film on the inner faces took place through natural external drying or evaporation. Afterwards parts of the saccharose used as dissolving agent which had crystallised out on the surface were simply washed off with water.

With regard to the quality of the coating product it may also be stated that in its liquid or paintable state it had a somewhat milky quality, but after drying and hardening it formed a thin glassy film. In this way a completely waterproof coating was produced which had moreover penetrated sufficiently deep into the pores of the building material in order reliably to prevent renewed growth of moss. In this case the further advantage was provided that due to the glassy film a clean unspoilt appearance of the mosaic walls of this swimming pool could be created and maintained.

What is claimed is:

1. A substance for proofing a surface of solid building material against liquids and chemical and biological corrosion comprising an aqueous solution product having silicon, calcium, and sodium ions and produced from a mixture of two separately formed aqueous solutions one of which contains water, dissolved calcium oxide, and a dissolving agent which increases the solubility of the calcium oxide in the water and the other of which contains water and sodium silicate, said aqueous solution product being applicable in a wet state to said surface to form a coating on said surface which, after drying, forms a glassy film, said aqueous solution product containing the following components (in % by weight):

52.5–56% water ($H_2O$),
24–33% saccharose ($C_{12}H_{22}O_{11}$)
1.9–2.7% calcium oxide (CaO), and $$8.6 - \frac{21.3\%}{100\%}$$

sodium metasilicate pentahydrate ($Na_2SiO_3 5H_2O$).

2. The substance according to claim 1 wherein said aqueous solution product contains calcium and sodium in a weight ratio of Ca: $Na_2$ of approximately 0.1–1.0.

3. A substance for proofing a surface of solid building material against liquids and chemical and biological corrosion comprising an aqueous solution product having silicon, calcium, and sodium ions and produced from a mixture of two separately formed aqueous solutions one of which contains water, dissolved calcium oxide, and a dissolving agent which increases the solubility of the calcium oxide in the water and the other of which contains water and sodium silicate, said aqueous solution product being applicable in a wet state to said surface to form a coating on said surface which, after drying, forms a glassy film, said aqueous solution product containing the following components (in % by weight):

55.6–68% water ($H_2O$),
31–36.6% glycerine ($C_2OH$—$CHOH$—$CH_2\ OH$),
1.1–1.31% calcium oxide (CaO), and $$4.3 - \frac{12.3\%}{100\%}$$

sodium metasilicate pentahydrate ($Na_2SiO_3 5H_2O$).

4. The substance according to claim 1 or 3 wherein said aqueous solution product is dilutable for use by water. by water.

* * * * *

UNITED STATES PATENT AND TRADEMARK OFFICE
CERTIFICATE OF CORRECTION

PATENT NO.    : 6,395,075 B1
DATED         : May 28, 2002
INVENTOR(S)   : Joseph E. Doumet It is certified that error appears in the above-identified patent and that said Letters Patent is hereby corrected as shown below:

<u>Title page,</u>
Item [57], ABSTRACT, substitute the following abstract for the abstract presently of record:

-- ABSTRACT
A water-repellant and impregnating product for waterproofing and impregnating a building material surface, a method of producing such product and a method of applying such product to such surface wherein such product is a mixture of two aqueous solutions which following application and drying forms a hard, glassy film on the surface to which it is applied. --

<u>Column 8,</u>
Lines 62-63, cancel "by water."

Signed and Sealed this

Thirty-first Day of December, 2002

JAMES E. ROGAN
*Director of the United States Patent and Trademark Office*